Dec. 12, 1939.  W. R. CHESLEY  2,183,159
MACHINE FOR FEEDING AND SHEARING STRIP MATERIAL
Filed June 22, 1936  6 Sheets-Sheet 1
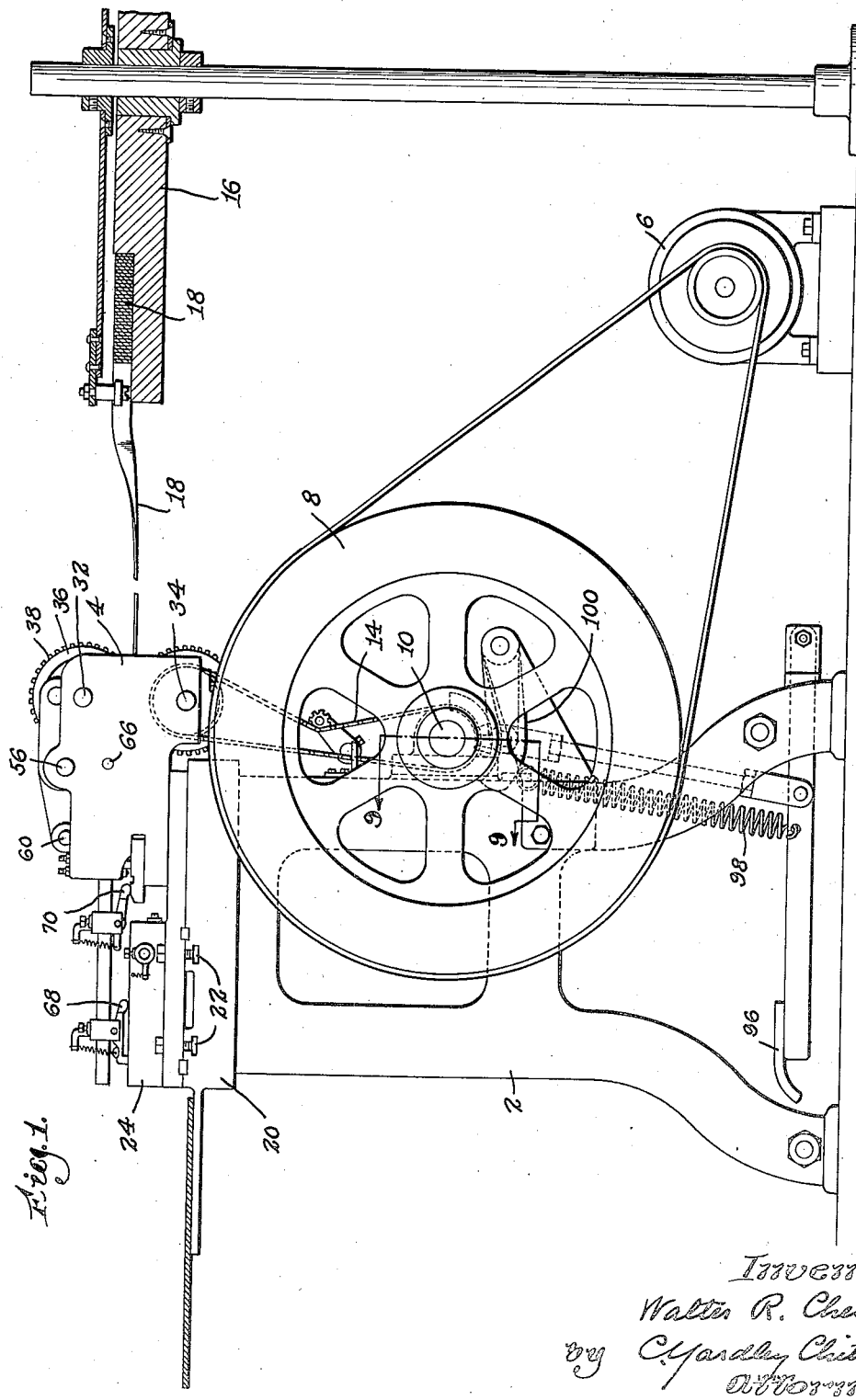

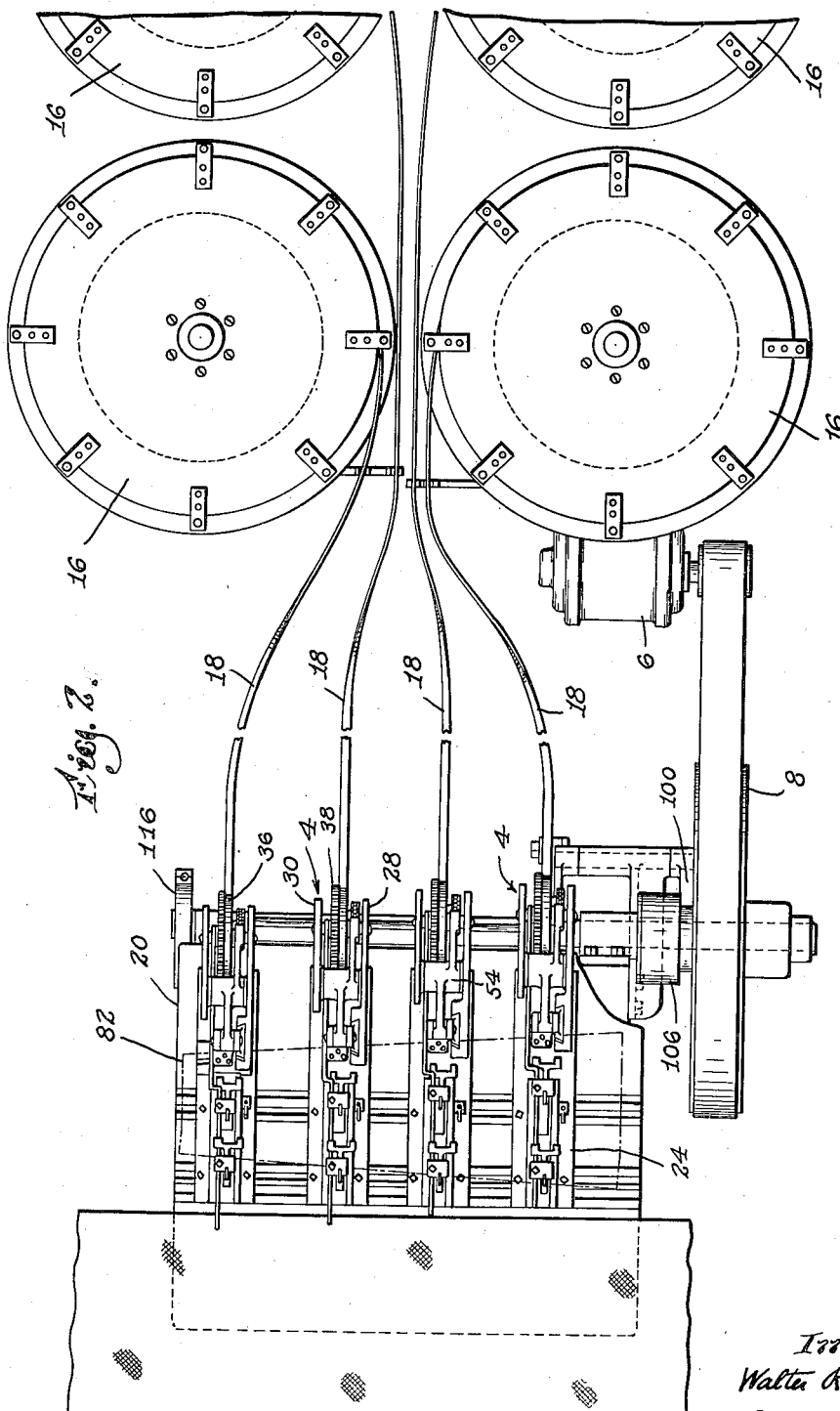

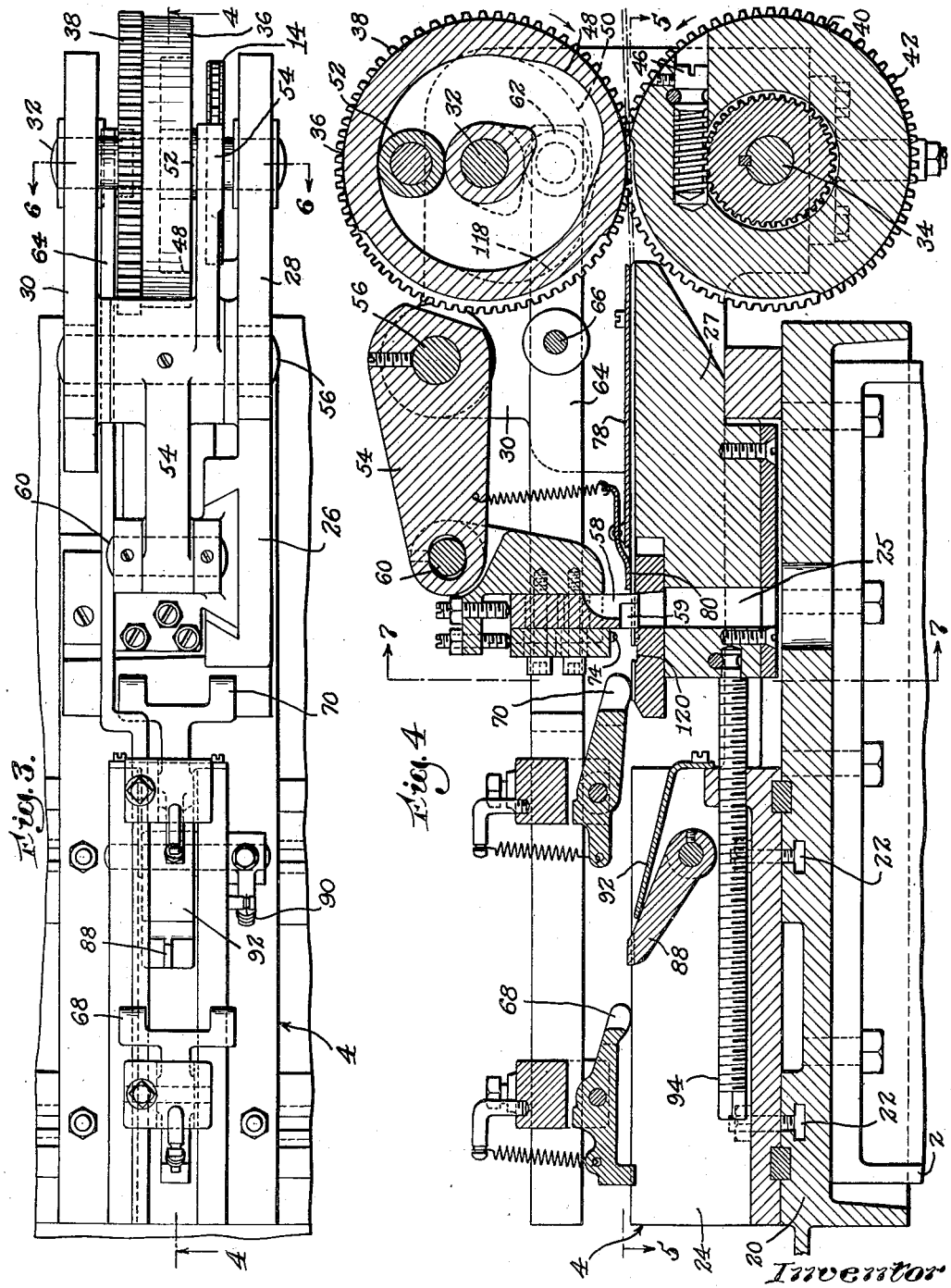

Dec. 12, 1939.                W. R. CHESLEY                2,183,159
                 MACHINE FOR FEEDING AND SHEARING STRIP MATERIAL
                     Filed June 22, 1936          6 Sheets-Sheet 4
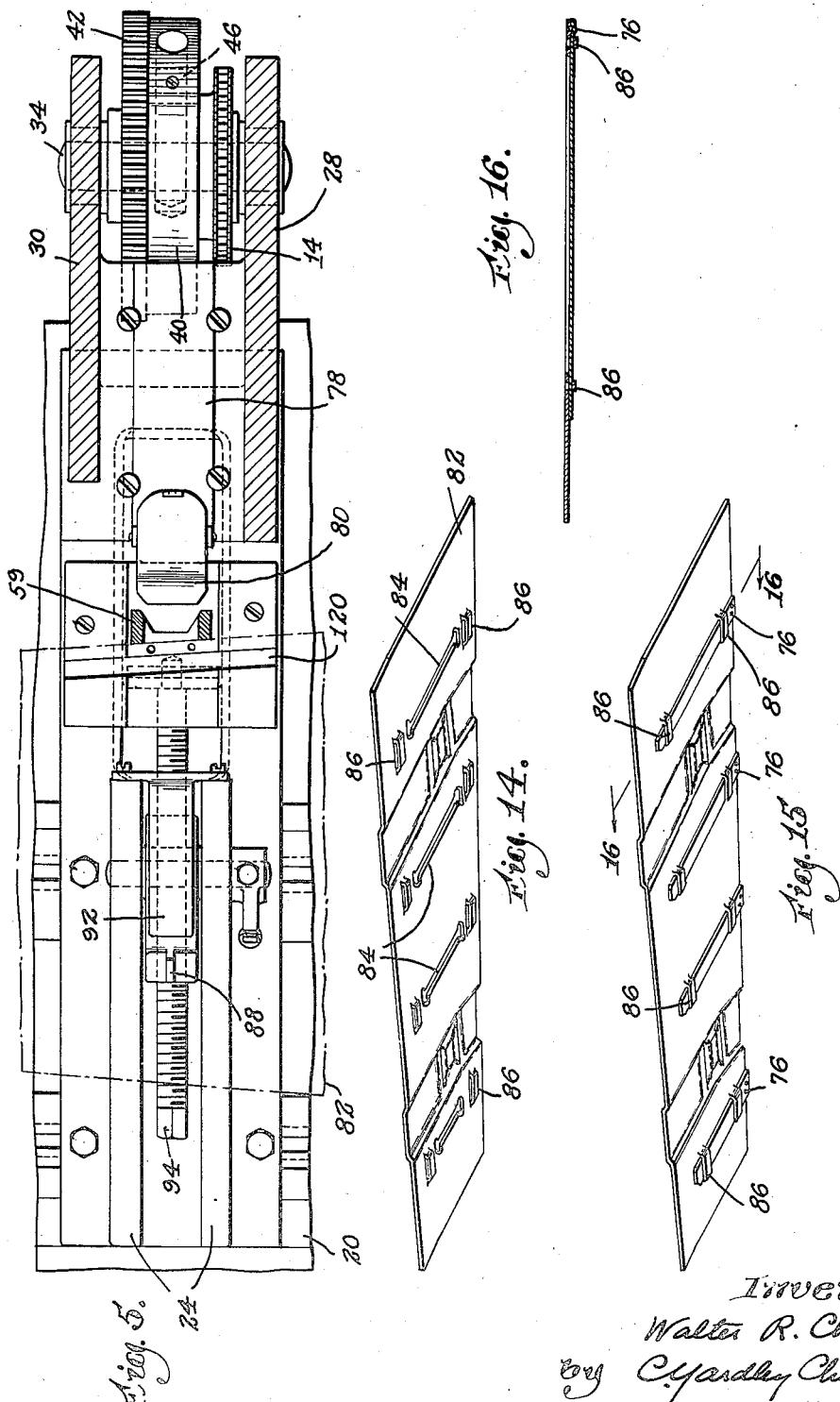
Inventor
Walter R. Chesley
by C. Yardley Chittick
    Attorney

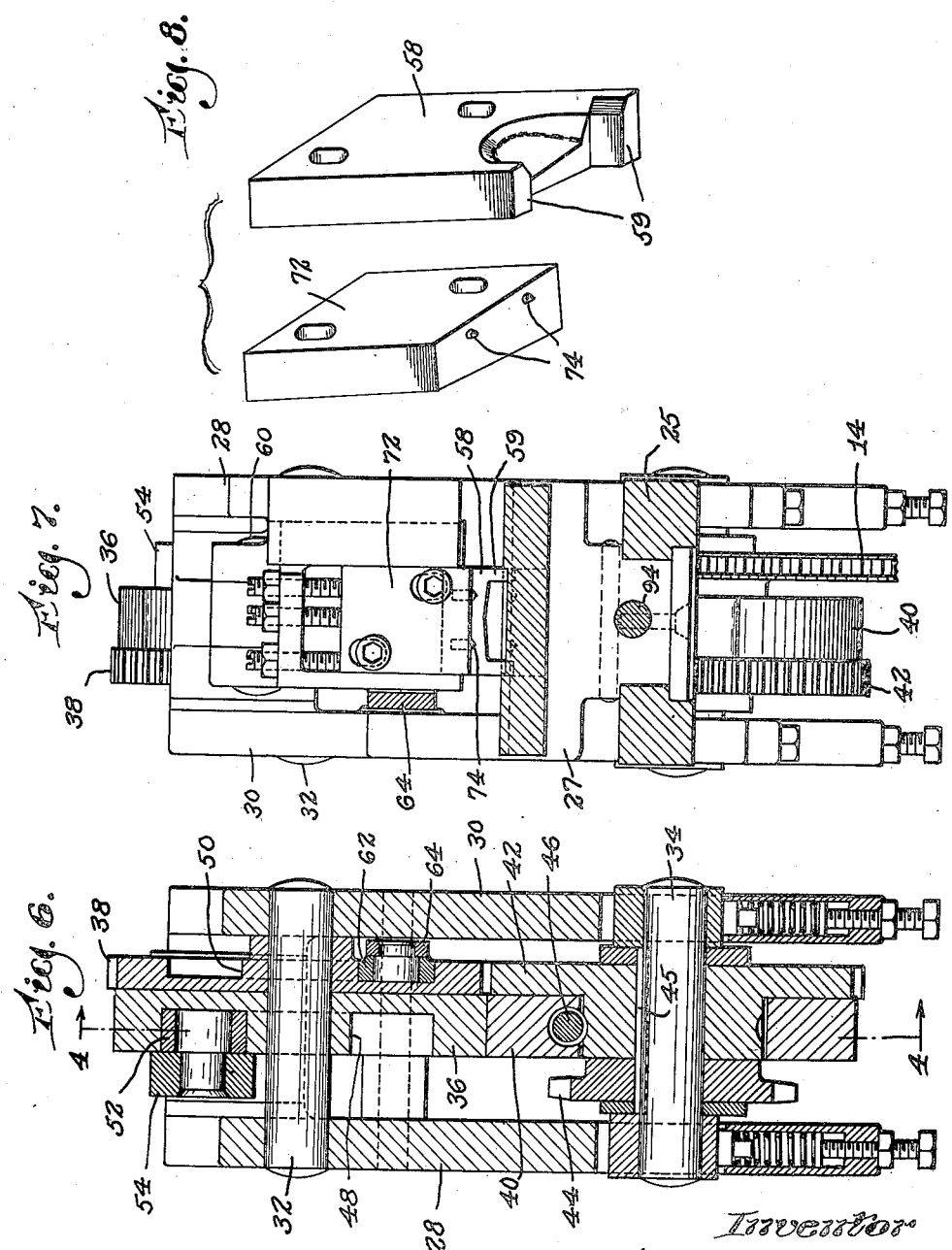

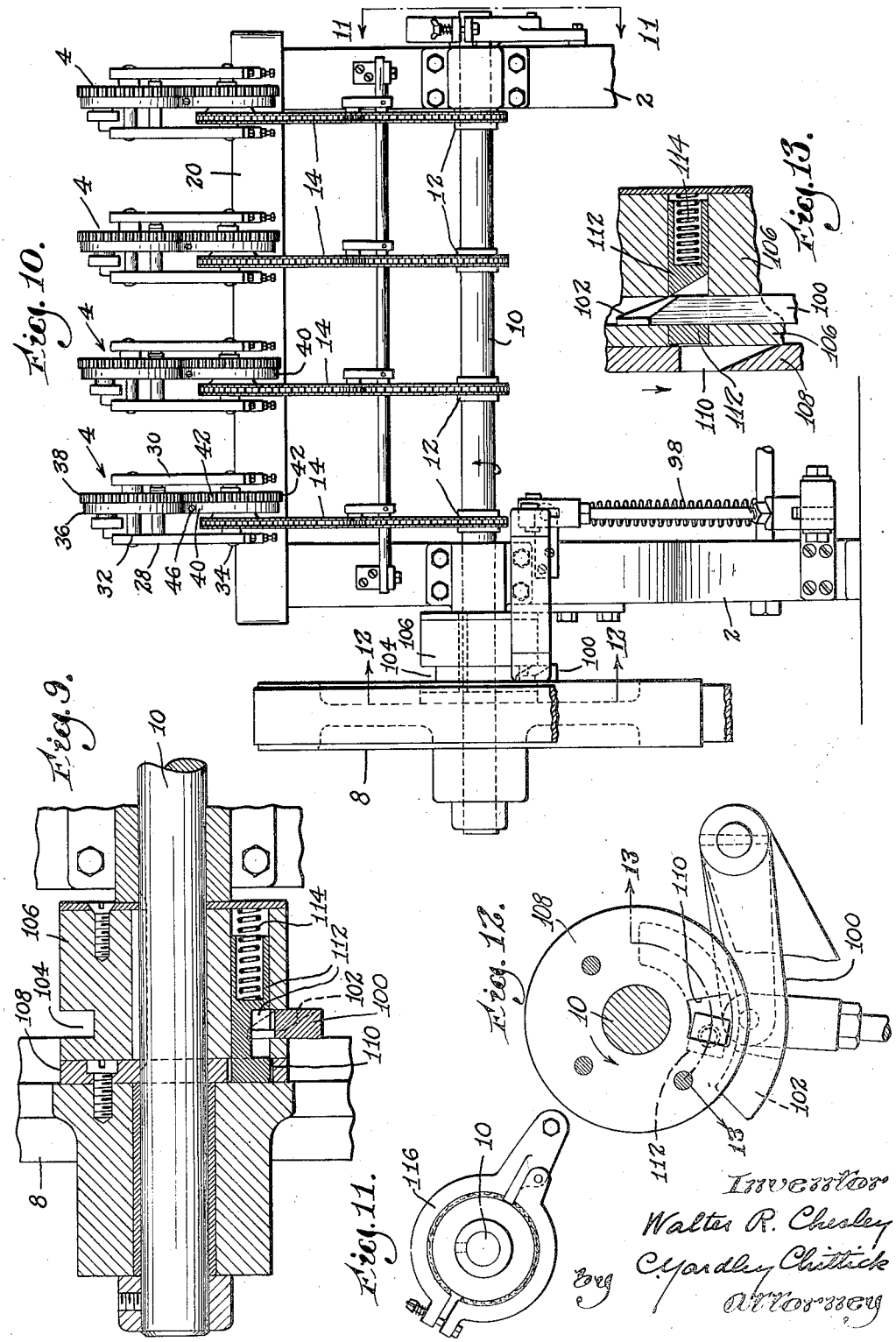

Patented Dec. 12, 1939

2,183,159

UNITED STATES PATENT OFFICE 2,183,159

MACHINE FOR FEEDING AND SHEARING STRIP MATERIAL

Walter R. Chesley, Somerville, Mass., assignor, by mesne assignments, to F. L. Jacobs Company, Detroit, Mich., a corporation of Michigan Application June 22, 1936, Serial No. 86,555

5 Claims. (Cl. 113—1)

This invention pertains to a means and method of feeding and shearing strip metal.

One of the objects of this invention is to provide a machine which is adapted to feed a metal strip into position in a previously prepared metal blank, and thereafter shear said strip at a suitable location.

Another object of this invention is to provide means whereby, by simple adjustments, varying lengths of metal may be fed and sheared.

Other objects and purposes of my invention will become apparent as the description, with the aid of the accompanying drawings, proceeds.

In the drawings:

Fig. 1 is a side elevation;

Fig. 2 is a plan view;

Fig. 3 is an enlarged plan view of one of the feeding and shearing units;

Fig. 4 is a vertical section on the lines 4—4 of Figs. 3 and 6;

Fig. 5 is a plan view on the line 5—5 of Fig. 4;

Fig. 6 is a vertical section on the line 6—6 of Fig. 3;

Fig. 7 is a vertical section on the line 7—7 of Fig. 4;

Fig. 8 shows the punch and upper shear blade in perspective;

Fig. 9 is a section on the line 9—9 of Fig. 1 showing a detail of the clutch;

Fig. 10 is a rear elevation;

Fig. 11 is a view on the line 11—11 of Fig. 10 showing a brake;

Fig. 12 is a view on the line 12—12 of Fig. 10 showing details of the clutch;

Fig. 13 is a view on the line 13—13 of Fig. 12 showing further details of the clutch;

Fig. 14 shows the prepared blank into which metal strips are to be inserted;

Fig. 15 shows the blank with the metal strips in position;

Fig. 16 is a section on the line 16—16 of Fig. 15.

My machine comprises in general a frame 2 and a plurality of feeding shearing units 4 to which power is supplied by means of a motor 6 and a fly-wheel 8.

By means of a suitable clutch, fly-wheel 8 operates main drive shaft 10 which is mounted on the frame 2 by suitable bearings. Suitable sprockets 12 pinned to shaft 10 and chains 14 transmit power to the units 4.

The clutch which will hereinafter be described in detail is of the type whereby the shaft 10 can be caused to rotate one revolution at a time, thus enabling the units to perform through one cycle, during which the metal strip is fed and sheared.

Mounted horizontally behind the machine are a series of reels 16 on which the strip metal is wound as at 18 in Fig. 1. There is one reel of metal for each feeding and shearing unit. Since all of the feeding and shearing units are identical the construction and operation of one will be described.

As a foundation for all of the units a base plate 20 is bolted to frame 2 as shown in Fig. 4. Mounted thereon are the several units 4 each of which is laterally adjustable by virtue of the T-slots 22 and the bolts engaging therein.

Each unit 4 consists of a front work supporting frame 24 and a rearward extension 25 which carries the feeding and shearing unit generally designated as 26 in Fig. 3 on an adjustable slide 27.

The work supporting member 24 has means for suitably alining the blank into which the strip of metal is to be fed and the feeding and shearing mechanism 26 provides means for feeding exactly the right amount of metal and shearing it at the edge of the blank.

The feeding and shearing mechanism 26 comprises two side supports 28 and 30 between which are mounted two axles 32 and 34. On axle 32 is mounted the feed roll 36 and the associated gear 38 and on axle 34 is mounted the feed roll 40 and associated gear 42, see Fig. 6. Gear 42 is splined at 45 to axle 34 along with the upper socket 44 which is driven by chain 14 from main shaft 10. Gears 38 and 42 have the same number of teeth so that one revolution of sprocket 44 will cause one revolution of the feeding rolls 36 and 40.

In Fig. 6 it will be observed that axle 34 is mounted on spring supported bearings permitting the feed rolls 36 and 40 to separate slightly as the strip metal is fed between.

In order to control the amount of metal that is fed during one revolution of the feed rolls an adjustment 46 shown in Fig. 4 is provided. By rotating the adjusting screw, the non-cut-away faces of the feed rolls can be caused to engage through varying arcs during their rotation. In this way the amount of metal fed for one revolution of the feed rolls may be varied.

In the upper feed roll 36 and the gear 38 are two cam tracks 48 and 50. Cam track 48 operates a follower 52 which in turn, by means of a lever 54 mounted on shaft 56, actuates a shear 58 through the loose linkage 60. Cam track 48 is so arranged that shear 50 is operated after the strip has been fed its full distance. As shown in Fig. 8, shear 58 has a pair of legs 59 which straddle the metal strip.

As can be seen from Figs. 5 and 8 the shear 58 has two cutting edges. The cutting edge adjacent the blank severs the strip so that the severed edge is substantially parallel to the edge of the blank. The other cutting edge of shear 58 is shaped so that the leading edge of the strip will be beveled at its corners, thus facilitating entrance of the strip into its proper position in relation to the blank. With this type of shear it is necessary that a small transverse section of the strip be entirely removed but the waste is so small as to be negligible.

Cam track 50 operates a follower 62 which is connected with a lever 64 pivoted on shaft 66 to raise and lower the mechanism that supports the spring pressed fingers 68 and 70. When spring pressed fingers 68 and 70 are raised above the work supporting frame 24, the blank into which the strip is to be fed may be inserted or removed. Positioned immediately in front of the shear blade 58 is a punch member 72 having two small punches 74 which indent the blank and metal strip to prevent accidental dislodgement. These indentations may be seen at 76 in Figs. 15 and 16.

To guide the strip as it approaches the blank from the feeding rolls is a cover plate 78 shown in Figs. 4 and 5. At the end of this cover plate is a spring pressed finger 80 to assist in holding the strip in position.

I have provided the following means for positioning the blank 82, which, when in the machine, assumes the position shown by the broken line in Fig. 2. As will be observed in Fig. 14 the blank 82 has a plurality of parallel transverse slots 84 at the ends of which are depressed straps 86. Since the metal strip is to be fed through the depressed straps it is necessary to aline them with the line of feed of the strip. To this end I provide the fingers 88 held in upward position by springs 90, and prevented from excess movement by stops 92. With the fingers 68 and 70 raised above the work-supporting frame 24, the blank may be inserted so that the forward edge engages the depending legs 59 of the shear 58 while the fingers 88 are positioned in the transverse slots 84. In this way each pair of straps 86 is alined with the on-coming metal strip.

To provide for blanks of varying tapers the feeding and shearing mechanism mounted on slide 27 may be longitudinally adjusted by means of the adjusting screw 94 threaded through the work supporting frame 24 and rotatably connected with the slide 27, as shown in Fig. 4.

The clutch is operated as follows. By suitable linkage the foot treadle 96, normally held in raised position by spring 98, is arranged to move lever 100, having a wedge-like end 102, up and down. This lever is adapted to enter the groove 104 in the collar 106 shown in Fig. 9, which collar is keyed to the main shaft 10. As will be observed in Fig. 9, fly-wheel 8 is free to revolve on shaft 10. Bolted to one side of the fly-wheel hub is a plate 108 having a hole 110 therethrough. Into this hole is adapted to slide a spring pressed plunger 112 mounted in collar 106 and shown in Figs. 12 and 13. However, as long as lever 100 is in its upward position in slot 104 plunger 112 must remain in its retracted position as shown in Fig. 13 and disconnected from fly-wheel 8. However, upon downward movement of treadle 96 lever 100 is withdrawn from the groove 104 and from engagement with plunger 112, whereupon under the influence of spring 114 plunger 112 is moved to the left facing Fig. 9 and engages in the hole 110 in plate 108. On engaging of the plunger 112 in the aperture 110 of the flywheel plate 108, the flywheel 8 is coupled to the collar 106 to rotate the shaft 10. The plunger 112 rotates with the collar 106 and on release of the foot treadle 96, the lever 100 moves up into position where on completion of a revolution of the shaft, the lever end 102 engages in the plunger aperture and moves the plunger out of the aperture 110 disengaging the flywheel and shaft collar 106. By immediately releasing treadle 96 the lever 100 is again moved into the groove 104 and its wedge end 102 engages the plunger 112 at the completion of one revolution of the latter to withdraw it from the hole 110. In this way the feeding and shearing mechanism is caused to go through but one cycle at a time.

To prevent over-running of the shaft 10, I have provided a brake 116 shown in Figs. 10 and 11. This brake is on all the time but is not of sufficient power to interfere with the operation of the machine.

The operation of the machine is as follows. At the period of rest the feed roll 36 and the gear 38 are so positioned that the cam surface 50 has its distended portion 118 at the bottom so that cam follower 62 is in its most downward position whereby fingers 68 and 70 are raised above the work supporting frame 24. The blank 82 then is inserted so that the forward edge engages the legs 59 of shear 58 and fingers 88 project upwardly through the slots 84. One of the depressed straps fits in the cavity 120 shown in Figs. 4 and 5, the other strap being between the walls of the work supporting frame 24. The operator then steps on the treadle 96 to inaugurate a cycle of operation. With the feeding rolls rotating in the directions shown by the arrows in Fig. 4 the surfaces of the rolls which are not cut away engage the strip and advance it an amount determined by the setting of adjustment 46. The strip passes under the cover 78, finger 80, and between the legs 59 of shear 58 and into the tunnel formed by the strap 86. The strip continues along on the under side of the blank until it engages finger 88 which is driven downwardly by the advancing strip which thereafter enters into position in the tunnel formed by the second strap 86. At this point the feeding rolls disengage by virtue of the cut away portion shown in Fig. 4 and the shear 58 is operated by the cam follower 52 within the cam track 48 and the associated lever 54.

Upon operation of shear 58, the punches 74 operate to indent the blank and strip as heretofore referred to. Automatic disengagement of the clutch then takes place with the feed rolls coming to rest with portion 118 of cam track 50 at the bottom so that fingers 68 and 70 are again raised. Since the strip has been sheared by the shear blade 58 the blank can then be removed and another placed in the machine, whereupon the operation will be repeated.

Since all of the units 4 are the same and operate simultaneously upon actuation of shaft 6 it is apparent that as many strips may be fed and sheared as there are units 4 or slots to be covered in blank 82.

Upon removal from the machine the blank appears as in Fig. 15 with a metal strip covering each of the slots 84 and held in position by straps 86.

While I have shown and described a preferred form of my invention I wish it to be distinctly understood that I do not intend to be limited thereby but only by the appended claims.

I claim:

1. In an apparatus of the character described, supporting means for a blank having spaced apart aligned straps, means for intermittently advancing a continuous metallic strip, means for holding the blank with the aligned straps in alignment with the metallic strip, means for shearing the metallic strip after a predetermined advancement thereof to leave a strip portion beneath the straps of the blank and at the same time beveling the lead edge of the continuous strip to facilitate its positioning beneath the straps of another blank, and means for mutually deforming the blank and strip portion to secure them together.

2. In an apparatus of the character described, supporting means for a blank having spaced apart aligned straps offset from one surface of the blank, means for intermittently feeding a continuous metallic strip, means for holding the blank with the aligned straps in alignment with the metallic strip, means for shearing the metallic strip after movement thereof to leave a strip portion beneath the straps of the blank, and means operable to deform the strip and blank to hold them against relative movement.

3. In an apparatus of the character described, supporting means for a blank having a pair of spaced aligned straps extending across a slot in the blank and offset from one side of the blank, means to advance intermittently a continuous metallic strip, means to hold the blank with the straps in alignment with the strip, means to guide the strip beneath said straps, means to shear the strip leaving a strip portion under the straps, and means to indent the strip portion and blank to hold the strip portion to the blank in place over the slot.

4. In an apparatus of the character described, a supporting means for a blank having a plurality of laterally positioned pairs of straps offset from one side of the blank, means to advance intermittently a plurality of separate and continuous metallic strips under the straps of the blank, resilient means acting to hold the blank with the pairs of straps respectively in alignment with the metallic strips, resilient means acting on the metallic strips to hold the strips against the supporting means, means to sever the strips leaving strip portions beneath the pairs of straps, and means for indenting the several strips and blank to hold the strips to the blank.

5. In an apparatus of the character described, supporting means for a blank having aligned straps offset from one side of the blank, means for intermittently feeding a continuous metallic strip, means biased to engage and hold the blank against said supporting means with the straps arranged to receive a portion of the strip thereneath, said holding means being movable out of engagement with the blank, means operable in accordance with the operation of said feeding means for moving said holding means out of engagement with the blank, means operable upon cessation of feeding of the strip to shear the strip leaving a portion thereof beneath the straps, and means operable simultaneously with the shearing means for indenting the blank and strip to hold them together.

WALTER R. CHESLEY.